(12) United States Patent
Mueck

(10) Patent No.: US 8,646,308 B2
(45) Date of Patent: Feb. 11, 2014

(54) ROBUST SELF TESTING OF A MOTION SENSOR SYSTEM

(75) Inventor: Michael Mueck, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 850 days.

(21) Appl. No.: 12/754,251

(22) Filed: Apr. 5, 2010

(65) Prior Publication Data

US 2010/0251800 A1 Oct. 7, 2010

Related U.S. Application Data

(60) Provisional application No. 61/166,583, filed on Apr. 3, 2009.

(51) Int. Cl.
*G01P 21/00* (2006.01)

(52) U.S. Cl.
USPC .......................................................... 73/1.38

(58) Field of Classification Search
USPC .......................................................... 73/1.38
See application file for complete search history.

(56) References Cited

U.S. PATENT DOCUMENTS 7,093,478 B2 * 8/2006 Chau et al. ..................... 73/1.38
2006/0150709 A1 * 7/2006 Deb et al. ....................... 73/1.38

OTHER PUBLICATIONS

N. Deb, et al., "Built-in self test of CMOS-MEMS Accelerometers," ITC International Test Conference, pp. 1075-1084, 2002.
Focus Test, "Synchronized Accelerometers Test Systems Deliver Accurate Results," product information sheet, FocusTest, Inc., http://www.focustestinc.com/products-accelerometer.htm web page, 2007.

* cited by examiner

*Primary Examiner* — Peter Macchiarolo
*Assistant Examiner* — Alex Devito
(74) *Attorney, Agent, or Firm* — Sunstein Kann Murphy & Timbers LLP

(57) ABSTRACT

A method for self-testing a dual-mass linear accelerometer in which a self-test voltage is applied to urge the two masses to move in opposite directions. Self-test signals are then applied to obtain a differential mode signal to detect masses repositioned in opposing directions. During testing, common disturbances to the two masses are rejected as common mode signals.

23 Claims, 5 Drawing Sheets

ROBUST SELF TESTING OF A MOTION SENSOR SYSTEM

CROSS REFERENCE TO RELATED APPLICATIONS

This application claims the benefit of U.S. Provisional Patent Application No. 61/166,583, filed Apr. 3, 2009, titled "Robust Self Testing of a Motion Sensor System," the entire contents of which are hereby incorporated by reference herein, for all purposes

TECHNICAL FIELD

The present invention relates to dual-mass motion sensor systems, and more particularly to self testing of dual-mass MEMS (microelectromechanical system) sensor devices.

BACKGROUND ART

It is known in the prior art to self test a MEMS device, such as during a quality control phase of a fabrication process. Some MEMS devices, such as accelerometers, include spring-supported movable masses. In a defective unit, the mass may be immobilized, such as by debris trapped in a space into which the mass is design to move, or the spring may be too stiff or not stiff enough, or the mass may not be sufficiently attached to surrounding structures. In either case, in response to accelerating the device, the mass may not move as it was designed to do. For example, the mass may move too much, too little or not at all.

During testing, an electrical signal is typically applied to the device to move a movable mass, or several movable masses, in a given direction, typically the same direction as acceleration is normally sensed by the device, and any movement of the mass or masses is measured. If the mass or masses do not move as expected, a defect is detected.

Such self testing may be adversely affected by ambient motion or noise. Such corruption is usually compensated for by averaging measurements over a sufficiently long time, such that the test signal can be recovered to a desired accuracy. Alternatively, efforts can be made to shield the device from such ambient disturbances during testing. However, such additional test time or sensor shielding during manufacturing adds to the cost of the product.

An alternate approach to making self testing accurate, despite ambient disturbances, has been to utilize a test signal having a frequencies higher than the expected ambient rumble or a device's frequency response. In such cases, the outputs can be high-pass filtered to obtain the results of the test. With this approach, the test signal response would, however, be at a significantly lower output level. Furthermore, the results would be subject to high frequency resonances.

SUMMARY OF THE INVENTION

In a first embodiment of the invention, there is provided a method for self testing a MEMS device. The method is especially suitable for a dual-mass MEMS sensor device, in particular a linear sensor device. Therefore, a MEMS device is provided with a first MEMS body carrying a first movable electrode establishing a capacitance with a first fixed electrode and a second MEMS body carrying a second movable electrode establishing a capacitance with a second fixed electrode. Any of the electrodes may be implemented as a pair of electrodes and indeed there may be many of each of the electrodes. For example, there may be numerous first movable electrodes on the first MEMS body and correspondingly numerous first fixed electrodes. In a linear sensor device, the two MEMS bodies are arranged so that they are each reciprocally movable in the same axial direction.

A self test of the dual-mass MEMS device is performed by applying a self-test voltage such that the first MEMS body and the second MEMS body are urged to move in a manner not normally responsive to a physical acceleration. For example, one body would be urged in one direction normally associated with a given physical acceleration and the other body is urged in a direction not natural for that given physical acceleration. In a linear sensor device, for example, the two masses are urged to move in opposite directions. In order to measure proper operation of the MEMS bodies, self-test signals are applied to the first and second fixed electrodes so as to produce a common mode output from the first and second movable electrodes in response to movement of the first and second movable electrodes in naturally expected directions and to produce a differential output from the first and second movable electrodes in response to opposed repositioning of the first and second movable electrodes. Optionally or alternatively, the self-test signals may be applied to the first and second movable electrodes so as to produce a common mode output from the first and second fixed electrodes in response to movement of the first and second movable electrodes in naturally expected directions and to produce a differential output from the first and second fixed electrodes in response to opposed repositioning of the first and second movable electrodes. Thus, if the movable electrodes have been moved apart by the self-test voltage, their repositioning in opposite directions will be read clearly from the differential output. It is useful to provide the outputs of the electrodes to a differential amplifier. Any disturbance or movement of the device that affects the two MEMS bodies in the naturally expected manner will be ignored, because such disturbance will result in common mode output.

In a further embodiment, each movable electrode is positioned between a pair of fixed electrodes. The self-test voltage is applied by setting each movable electrode and one of the fixed electrodes in the corresponding pair of electrodes at approximately the same voltage level, and ideally at the same voltage level. In order to move the two MEMS bodies in unnaturally different directions (opposite in the case of the linear sensor), the single voltage level is applied to the first movable electrode and to the one electrode of a pair of fixed electrodes to one direction from the movable electrode and the single voltage level is applied to the second movable electrode and to the one electrode of its corresponding pair to the opposite direction from the second movable electrode. The setting of two electrodes at a single voltage level can be accomplished by switching the two electrodes into connection. Before applying self-test signals to the electrodes to obtain measurements, the switches would be switched to disconnect the movable electrodes from the one fixed electrode.

The self-test signals are applied so as to produce a common mode output from the electrodes in response to movement of the first and second movable electrodes in the same direction, and to produce a differential output from the electrodes in response to opposing repositioning of the first and second movable electrodes. The differential outputs may be further processed, such as by filtering, amplifying or integrating, and the common mode outputs may be rejected.

Each of the first and second fixed electrodes may include a pair of electrodes positioned on opposite sides of its corresponding movable electrode. Applying the self-test voltage may include setting each movable electrode and one of the fixed electrodes in the corresponding pair of electrodes at a common voltage level.

The first movable electrode may be switched into electrical connection with one of the fixed electrodes in the corresponding pair of fixed electrodes, and the second movable electrode may be switched into electrical connection with one of the corresponding pair of fixed electrodes.

Optionally, the method may be applied while a device is temporarily taken off line. For example, when a vehicle transmission is shifted into a "park" mode, MEMS accelerometers that normally detect crashes and trigger the deployment of airbags may be temporarily taken off-line for a brief period of time and self-tested. Normal test signals are applied while the device is on line. That is, the normal test signals are applied to at least one of the electrodes so as to produce a differential output signal from at least one of the electrodes in response to physical acceleration of the MEMS device and to produce a common mode output signal from at least one of the electrodes in response to unnatural movement of the first and second movable electrodes. During the off-line period, the normal test signals temporarily cease to be applied. During at least part of the temporary cessation, the self-test voltage is applied, the self-test voltage ceases to be applied, and then the self-test signals are applied and then cease to be applied. The temporary cessation last less than a predetermined amount of time related to an application of the MEMS device. After ceasing to apply the self-test signals, the normal test signals are again applied.

Another embodiment of the present invention provides a self-testable MEMS device. The device includes first and second MEMS masses configured for physical displacement along a common axis within the MEMS device in response to acceleration of the MEMS device. Each first MEMS mass has at least one first associated movable electrode configured for movement with the first MEMS mass. In addition, each first MEMS mass has at least one first associated fixed electrode. Similarly, each second MEMS mass has at least one second associated movable electrode configured for movement with the second MEMS mass. Each second MEMS mass has at least one second associated fixed electrode. Pairs of the fixed and movable electrodes establish capacitances, and each capacitance varies in relation to the spacing between the respective fixed and movable electrodes.

A signal generator is configured to apply at least one self-test voltage to the first and second fixed electrodes or to the first and second movable electrodes. As a result, one of the MEMS masses is urged to move against the movement it would naturally follow in response to an applied physical acceleration, and the other MEMS mass is urged to move in sympathy with the movement it would naturally follow in response to the same applied physical acceleration. After applying the at least one self-test voltage, the signal generator applies self-test signals to the first and second fixed electrodes or to the first and second movable electrodes. As a result, a common mode output signal is produced from the first and second movable electrodes (or from the first and second fixed electrodes) in response to physical acceleration of the MEMS device. In addition, a differential output signal is produced from the electrodes in response to unnatural repositioning of the first and second movable electrodes. This repositioning may be, for example, the masses returning to their neutral positions, after having been urged to move as described above.

A first switch may be coupled between the at least one first movable electrode and the at least one first fixed electrode, and a second switch may be coupled between the at least one second movable electrode and the at least one second fixed electrode. A control circuit within the MEMS device may be configured to close the first and second switches for at least part of the time the at least one self-test voltage is applied and to open the first and second switches for at least part of the time the self-test signals are applied.

A differential amplifier may be coupled to receive the differential output signal from the electrodes.

Each fixed electrode may include a pair of electrodes positioned on opposite sides, respectively, of its associated movable electrode. The first switch may be coupled between the at least one first movable electrode and one of the pair of electrodes of the first fixed electrode that lies in one direction from the first movable electrode. The second switch may be coupled between the at least one second movable electrode and one of the pair of electrodes of the second fixed electrode that lies in a direction opposite the one direction from the second movable electrode.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
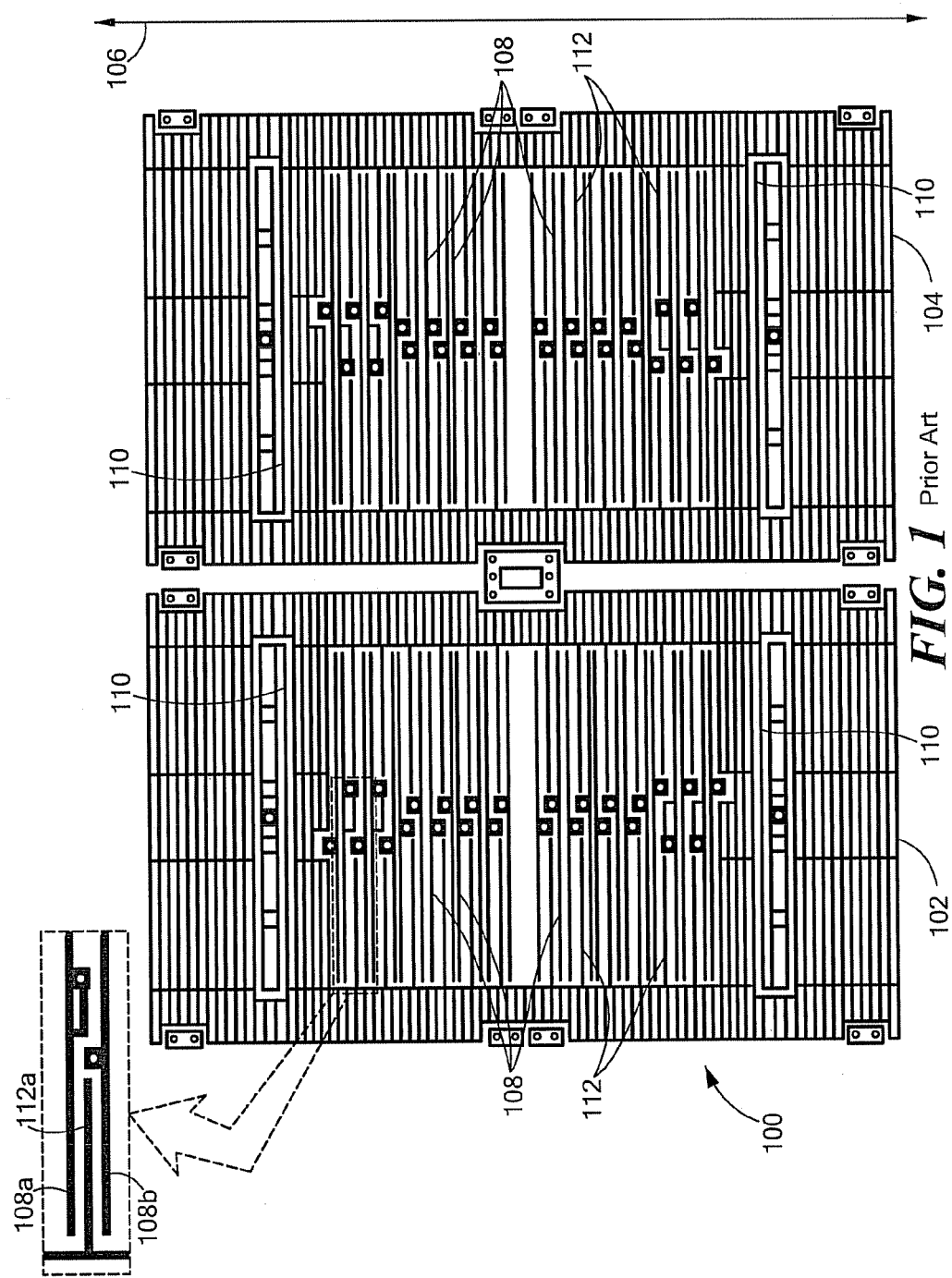
FIG. 1 is an illustration of a pair of masses in a portion of a prior art dual-mass linear accelerometer.

In accordance with embodiments of the present invention, during testing, an electrical signal (a "self-test voltage") is applied to a MEMS device under test in an attempt to displace movable masses of the device in an unnatural manner. That is, the self-test voltage is applied in an attempt to cause displacement of the movable masses in a manner that can not naturally occur as a result of physically accelerating the device. Movement or position of the masses is then measured to verify that the masses were displaced as expected and that the device is, therefore, good. In measuring the movement or position of the masses, "self-test signals" (different than the self-test voltage) are applied so as to produce one type of output signal (such as a common mode output) in response to physical acceleration of the device and so as to produce a different type of output signal (such as a differential output signal) in response to the unnatural displacement of the masses. The differential output may be amplified, and the common mode output may be rejected, thereby eliminating or reducing noise caused by physical acceleration of the device from test results. Consequently, the device may be successfully tested, even while the device experiences unpredictable physical acceleration. The test method may, therefore, be performed during manufacture or in situ, such as in a vehicle power-on self-test (POST) process whenever the vehicle is started. Furthermore, in situ self testing may be performed during normal use, while the device is briefly taken off-line.

The self-test voltage is applied to the device under test so as to displace the movable masses without requiring the device to be physically accelerated. For example, the self-test voltage may create electrostatic attractive forces between fixed and movable electrodes to urge associated movable masses in opposite directions, whereas physical acceleration of the device under test would cause the masses to be displaced in a common direction. Thus, the signals may be used to attempt to displace one of movable masses consistent with acceleration of the device in one direction while attempting to displace the other movable mass consistent with acceleration of the device in the opposite direction. The unnatural displacements enable the testing method to reject common mode outputs from the device under test, such as outputs caused by movements of the masses in a common direction, as may be caused by ambient noise. Thus, the test method may be successfully employed in the presence of unpredictable structural vibrations in, e.g. a test laboratory or fabrication facility or unpredictable movements of a vehicle while the vehicle's engine is started or passengers enter or exit the vehicle.

If the masses are displaced in directions, and/or optionally by amounts, consistent with the applied self-test voltage, the device under test may be deemed to be good. The positions and/or movements of the masses are determined, such as by applying self-test signals to the device and analyzing one or more output signals from the device. If the masses are displaced as expected, the device may be deemed to be good. However, if any of the masses are not displaced as expected, the device may be deemed to be defective.

FIG. 1 shows a prior art dual-mass linear accelerometer 100. In particular, FIG. 1 illustrates a portion of an ADXL78 single-axis, high-g, iMEMS® accelerometer manufactured by Analog Devices, Inc. of Norwood, Mass. A first MEMS body 102 and a second MEMS body 104 are juxtaposed in parallel. Both MEMS bodies 102 and 104 are arranged for reciprocal movement along a linear axis 106. The MEMS bodies 102 and 104 include rectangular box-shaped members that surround fixed electrodes 108. Alternatively (not shown), MEMS bodies may be centrally located, with fixed electrodes located about the periphery of the MEMS body. Each MEMS body 102 or 104 is supported by springs 110 near opposite ends of the MEMS body 102 or 104. The springs 110 allow the body 102 or 104 to move back and forth along the linear axis 106 in response to acceleration of the device 100.

Each MEMS body 102 or 104 carries at least one, and preferably many, electrode(s) 112 that move with movement of the body 102 or 104. Each movable electrode 112 establishes a capacitance with a corresponding fixed electrode 108. It is also typical, as shown in the enlarged portion of FIG. 1, for each corresponding fixed electrode 108 to be arranged as a pair of fixed electrodes (such as fixed electrodes 108a and 108b), one on each side of the corresponding movable electrode 112a. As such, movement of the movable electrode 112 increases the capacitance between the movable electrode 112 and one of the fixed electrodes 108 in the pair and decreases the capacitance between the movable electrode 112 and the other of the fixed electrodes 108 in the pair. The changes in these capacitances are sensed by measuring an output from the movable electrode 112 in response to test signals, such as clocking signals, applied to the fixed electrodes 108, as described in more detail with reference to FIG. 2.

Figure 2:
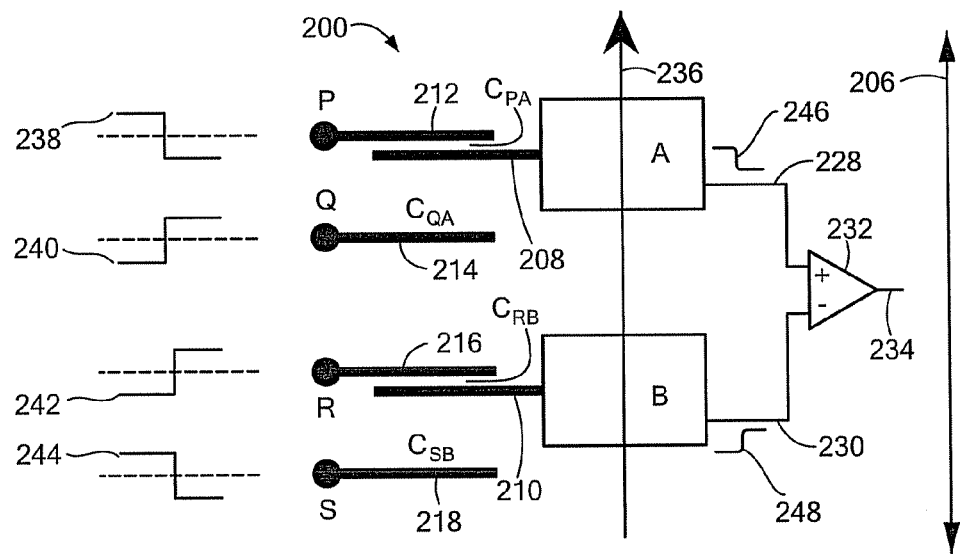
FIG. 2 is a schematic block diagram illustrating use of the dual massaccelerometer of FIG. 1.

FIG. 2 schematically represents an exemplary two-mass MEMS linear accelerometer device 200 and signals used to ascertain acceleration of the device. Two MEMS masses A and B are suspended by springs (not shown) and configured to move along a common axis 206 in response to acceleration of the device 100. To facilitate the following discussion, assume the masses A and B have been displaced from their neutral positions in the direction indicated by arrow 236. Each mass A or B has one or more movable electrodes, exemplified by movable electrodes 208 and 210, disposed between a pair of corresponding fixed electrodes, exemplified by fixed electrodes 212, 214, 216 and 218, respectively. The fixed electrodes 212-218 are electrically connected to respective terminals P, Q, R and S, to which signals may be applied. The movable electrodes 208 and 210 are electrically connected to respective leads 228 and 230 to provide output signals, which may be coupled to inputs of a differential amplifier or other signal processor 232 to produce an output signal 234.

Each movable electrode 208 or 210 forms a capacitance with each fixed electrode 212-218 of the pair of fixed electrodes associated with the movable electrode. Each of these capacitances is labeled with a letter "C" and two subscripts. The first subscript refers to the terminal (P-S) of the corresponding fixed electrode 212-218, and the second subscript refers to the mass (A or B) of the corresponding movable electrode 208 or 210. For example, the capacitance formed by movable electrode 208 (which is connected to terminal P) and fixed electrode 212 (which is associated with mass A) is label $C_{PA}$.

Assume masses A and B are displaced in the direction indicated by arrow 236. This displacement causes the movable electrode 208 to move closer to its corresponding upper fixed electrode 212 and away from its corresponding lower fixed electrode 214, thereby increasing the capacitance $C_{PA}$ and decreasing the capacitance $C_{QA}$, such that the electrical AC coupling between the upper fixed electrode 212 and the movable electrode 208 increases, and the electrical AC coupling between the lower fixed electrode 214 and the movable electrode 208 decreases. Thus, if AC signals, such as level changes (exemplified by normal test signals 238 and 240), square waves or sine waves, are applied to the terminals P and Q, relatively more of the normal test signal 238 applied to terminal P than the test signal 240 applied to terminal Q is coupled to the movable electrode 208 and passed via the lead 228 to the differential amplifier 232. Thus, if the normal test signals 238 and 240 are opposites, the output signal on the lead 228 indicates the direction of the displacement of the mass A and, optionally, the amount of the displacement. For example, if the normal test signal 238 includes a downward edge and the normal test signal 240 simultaneously includes an upward edge (as shown), at the same time the signal on the lead 228 will exhibit a downward slope, as shown at 246.

Assume mass B is configured to move in the same direction as mass A in response to an acceleration. If mass B is displaced in the direction indicated by the arrow 236, and normal test signals 242 and 244 (opposite those of normal test signals 238 and 240, respectively) are applied to terminals R and S, the signal on the lead 230 exhibits an upward slope, as shown at 248. The differential amplifier 234 amplifies the difference between the signals 246 and 248, thereby amplifying aspects of the signals that represent movement of the masses A and B in a common direction, such as the direction indicated by the arrow 236. Thus, regular acceleration of the device 200 in a single direction along the axis 206 yields differential signals 246 and 248.

Figure 3:
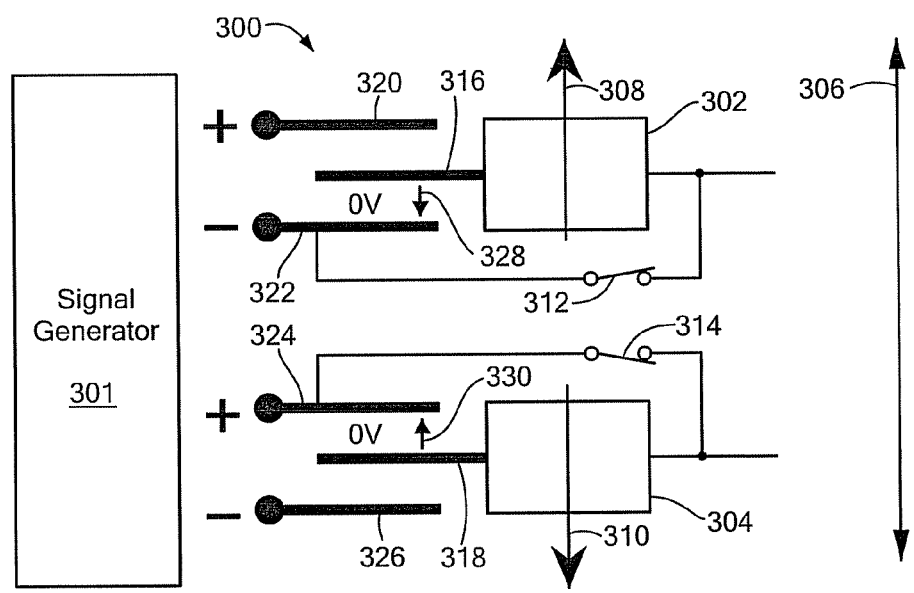
FIG. 3 is a schematic block diagram of a dual-mass accelerometer and self-test voltages applied thereto to urge the masses to move in an unnatural manner, according to an embodiment of the present invention.

Referring now to FIG. 3, in accordance with an embodiment of the present invention, self testing of a dual-mass linear accelerometer 300 is performed by applying a self-test voltage or self-test voltages, so that each of mass (also referred to as a "MEMS body") 302 and 304 is urged along a linear axis 306 in opposite directions 308 and 310. One way to so move the masses 302 and 304 is to use electrical switches 312 and 314 in the MEMS device to temporarily electrically connect each movable electrode 316 and 318 to one of the fixed electrodes 322 and 324 in the corresponding pair of fixed electrodes.

As shown in FIG. 3, the movable electrode 316 associated with the first MEMS body 302 is connected via the switch 312 to the fixed electrode 322 located in one direction 328 along the linear axis 306 from the movable electrode 316. The movable electrode 318 associated with the second MEMS body 304 is connected via the other switch 314 to the fixed electrode 324 located in the opposite direction 330 along the linear axis 306 from the movable electrode 318. In other words, if the first movable electrode 316 is connected to its southerly located fixed electrode 322, then the second movable electrode 318 is connected to its northerly located fixed electrode 324. It should be noted that when the movable electrode 316 or 318 is electrically connected to the corresponding fixed electrode 322 or 324, the fixed and movable electrodes 316 or 318 and 322 or 324 are at substantially equal potentials (as indicated by 0v in FIG. 3), and there is no electrostatic attraction between the fixed and movable electrodes 316 and 322 or 318 and 324.

When a self-test voltage is applied between the unconnected fixed electrode 320 and its corresponding movable electrode 316 (or between the other unconnected fixed electrode 326 and its corresponding movable electrode 318), the movable electrode 316 or 318 is electrostatically attracted to the unconnected fixed electrode 320 or 326, respectively. The connections are made so that the first and second MEMS bodies 302 and 304 move in directions 308 and 310 that are opposite one another. It should be noted that the movements of the MEMS bodies 302 and 304 in the directions 308 and 310 is unnatural, in that these movements can not naturally occur as a result of physically linearly accelerating the device 300. Self-test voltages, as indicated by "+" and "−" symbols, may be generated by an external voltage generator or by a signal generator 301 included on the same die as the MEMS bodies 302 and 304 or on a separate die included in the same package as the MEMS die.

Of course, rather than connecting the movable electrode 316 or 318 with one of the fixed electrodes 322 or 324, respectively, for proper testing one only needs to minimize attraction between the movable electrode 316 or 318 and one of the fixed electrodes 322 or 326, respectively. This may be accomplished by holding the two electrodes 316 and 322 or 324 and 318 at a substantially common voltage level. Optionally or alternatively, separately generated self-test voltages may be applied to the fixed and movable electrodes, thus the voltages on these electrodes may be only substantially similar.

Figure 4:
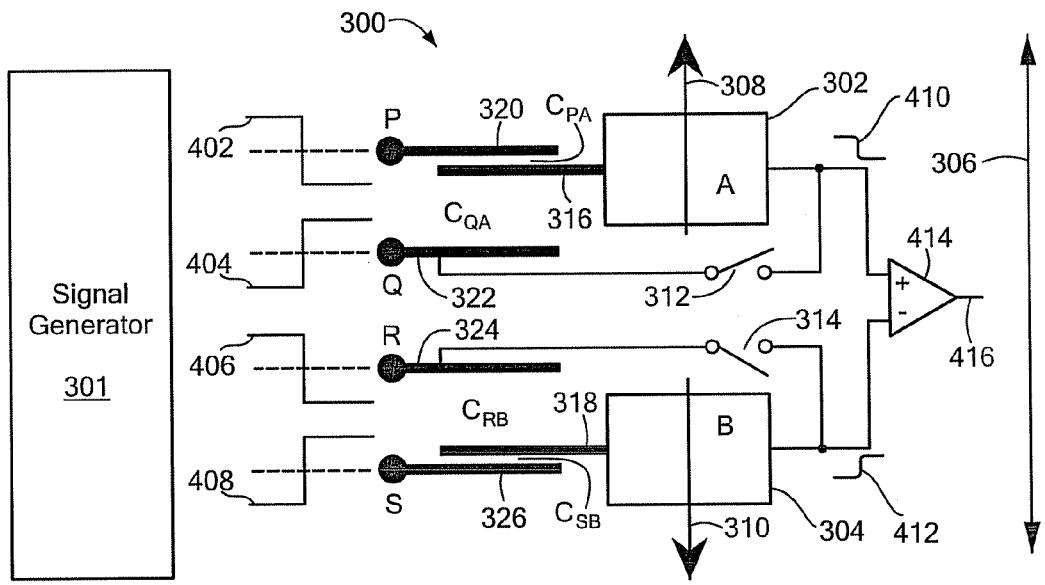
FIG. 4 is a schematic block diagram of the accelerometer of FIG. 3 and self-test signals applied thereto to detect the unnatural movements of the masses, according to an embodiment of the present invention.

As shown in FIG. 4, as a result of applying the self-test voltages as described above with reference to FIG. 3, in a well-functioning device 300, the MEMS bodies 302 and 304 are displaced in the directions 308 and 310, respectively, and consequently $C_{PA} > C_{QA}$ and $C_{SB} > C_{RB}$. After applying the self-test voltages, the switches 312 and 314 are opened, and the connected fixed electrodes 322 and 324 are disconnected or disassociated from the voltage on the movable electrodes 316 and 318. The switches 312 and 314 may be controlled by an external circuit or by a control circuit included on the same die as the MEMS bodies 302 and 304 or on a separate die included in the same package as the MEMS die. In some embodiments, the control circuit is part of the signal generator 301.

Before the MEMS bodies 302 and 304 are able to return to their neutral locations, self-test signals 402, 404, 406 and 408 (different than the self-test voltages) are applied to the fixed electrodes 320-326, respectively, such as via the terminals P-S, respectively. The self-test signals 402-408 are designed to produce a differential mode output, as exemplified by signals 410 and 412, from the masses 302 and 304, in response to movement of the first and second movable electrodes 316 and 318 in opposite directions. Thus, the differential amplifier 414 amplifies aspects of the signals 410 and 412 that represent movement of the masses 302 and 304 in opposite directions 308 and 310. In other words, the output signal 416 from the differential amplifier 414 represents the amount of unnatural displacement imparted to the MEMS bodies 302 and 304 by the self-test voltages described above.

Figure 5:
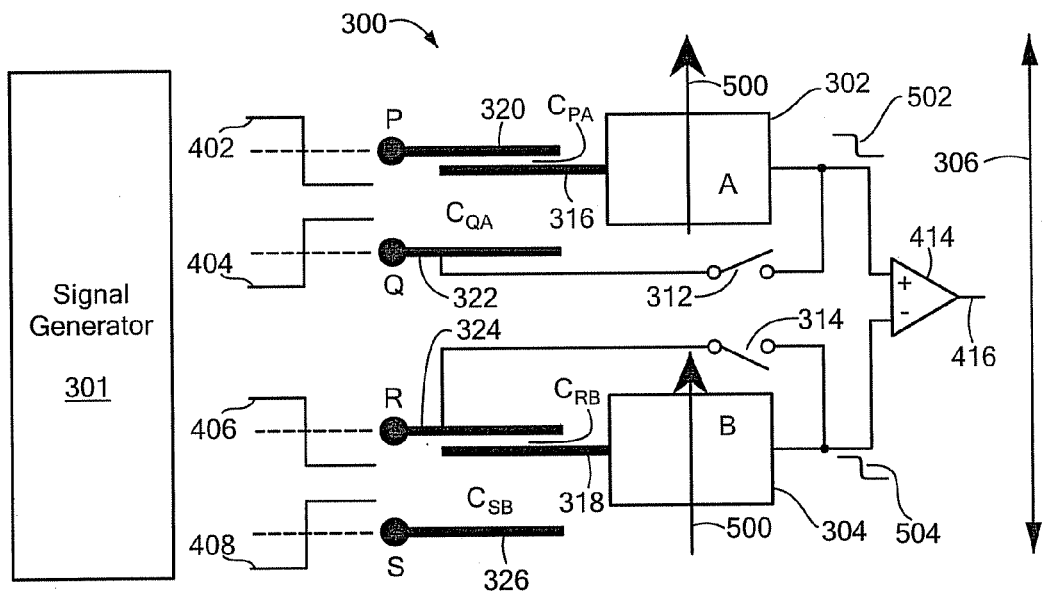
FIG. 5 is a schematic block diagram of the accelerometer of FIG. 3 showing the masses displaced by common mode noise and rejection of the noise signal, according to an embodiment of the present invention.

The self-test signals 402-408 are also designed to produce a common mode output in response to movement of the first and second movable electrodes 316 and 318 in a common direction. This enables the testing method to reject signals caused by ambient noise that accelerates the device under test. For example, as shown in FIG. 5, to the extent the MEMS bodies 302 and 304 are displaced in a common direction 500, $C_{RB}$ is greater and $C_{SB}$ is less than they would have been, absent the noise. Consequently, the signal 504 includes a larger component of the self-test signal 406, and it includes a smaller component of the self-test signal 408, than it would, absent the noise. The differential amplifier 414 does not amplify this common mode signal. Thus, the output signal 416 is not corrupted by the noise.

It should be noted that the self-test signals 402-408 are not those normally used in a linear differential accelerometer. (For example, compare self-test signals 402-408 of FIG. 4 to normal test signals 238-244 of FIG. 2.) Normally, one wants movement in a given naturally imposed direction to produce opposing signals from each of the two movable electrodes 316 and 318, so that the resultant is most clearly detected in a differential output. (Signals applied to the electrodes to detect such inertial movement of the masses is referred to as "normal test signals.") However, the "self-test signals" 402-408, according to an embodiment of the present invention, are such that they produce a differential output from the first and second movable electrodes 316 and 318 in response to opposed repositioning of the first and second movable electrodes 316 and 318. Thus, if one movable electrode has been repositioned in one direction and the other movable electrode had been repositioned in the opposing direction, the test reveals this proper functioning of the MEMS device.

In a preferred embodiment, the self-test signals 402 and 404 input to the fixed electrodes 320 and 322 corresponding to the first MEMS body 302 are the same as the self-test signals 406 and 408, respectively, input to the fixed electrodes 324 and 326 corresponding to the second MEMS body 304. In other words, for all those fixed electrodes 320 and 324 to the north of, or upwards from, their corresponding movable electrodes 316 and 318, the self-test signals 402 and 406 are the same. Likewise, the self-test signals 404 and 408 applied to the fixed electrodes 322 and 326 in the opposite direction from their corresponding movable electrodes 316 and 318 are also the same, but the self-test signal is normally opposite that of its paired fixed electrode 320 and 324, respectively. As shown in the specific embodiment of FIG. 4, the self-test signals 402 and 406 on the fixed electrodes 320 and 324 in one direction 308 from the movable electrodes 316 and 318 go from high to low at the same time that the self-test signals on the fixed electrodes 322 and 326 in the opposite direction 310 from the movable electrodes 316 and 318 go from low to high.

The self-test signals 402-408 may be generated by an external signal generator or by a signal generator 301 included on the same die as the MEMS bodies 302 and 304 or on a separate die included in the same package as the MEMS die.

Figure 6:
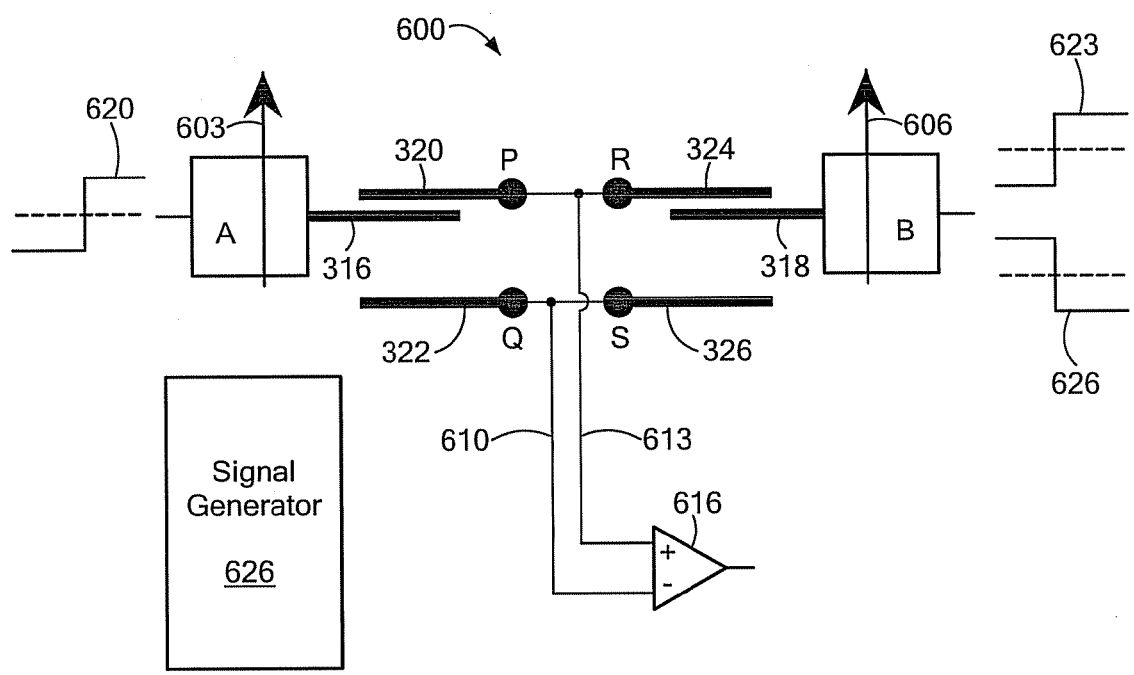
FIG. 6 is a schematic block diagram illustrating use of a dual mass accelerometer, according to another embodiment of the present invention.

Thus far, embodiments in which self-test signals are applied to fixed electrodes of movable masses have been described. However, in some other embodiments, the self-test signals may be applied to movable electrodes of the masses, as exemplified in FIG. 6. FIG. 6 schematically represents a two-mass MEMS linear accelerometer device 600. Assume the two masses A and B have been displaced in a common direction, as indicated by arrows 603 and 606, such as due to acceleration of the MEMS device 600.

As discussed above, with reference to FIG. 3, the masses A and B may also be unnaturally displaced by applying self-test voltages. Switches used to connect the fixed electrodes 320-326 to the movable electrodes 316 and 318 (as described above) are omitted from FIG. 6 in the interest of clarity.

Returning to FIG. 6, to facilitate supplying normal test signals and self-test signals to the movable electrodes 316 and 318, one fixed electrode 320 of one mass A is electrically connected to one fixed electrode 324 of the other mass B. Similarly, the other fixed electrode 322 of mass A is connected to the other fixed electrode 326 of mass B. The two sets of fixed electrodes 320/324 and 322/326 are electrically connected to provide output signals 610 and 613 to inputs of a differential amplifier 616. The electrical connections between the fixed electrodes 320 and 324 and between fixed electrodes 322 and 326 and between the fixed electrodes 320-326 and the differential amplifier 616 may be permanent, or they may be implemented with switches (not shown).

In normal operation, that is, to detect physical acceleration of the device 600, normal test signals 620 and 623 are applied, such as by a signal generator 626, to the two movable electrodes 316 and 318. To the extent that the masses A and B are displaced in a common direction, similar normal test signals 620 and 623 are coupled to the connected fixed electrodes 320/324 and 322/326, and the coupled signals are amplified by the differential amplifier 616. To the extent that the two masses A and B are displaced in opposite directions, the coupled signals fed to opposite inputs of the differential amplifier 616, which rejects the output signals 610 and 613 resulting from this unnatural displacement.

In a self-test mode, the test signal 620 used in normal operation is also used as a self-test signal and is applied to one of the movable electrodes 316. However, in the self-test mode, a self-test signal 626, different than the test signal 623, is applied to the other of the movable electrodes 318. In the self-test mode, the differential amplifier 616 amplifies output signals 610 and 613 resulting from opposite movements of the masses A and B, and the differential amplifier rejects output signals 610 and 613 resulting from movements of the masses in a common direction.

Thus, normal test signals 620 and 623 are used during normal use to emphasize common mode movements of the masses A and B and to reject differential movements of the masses. On the other hand, different input signals 620 and 626 are used for self testing to emphasize differential movements of the masses and to reject common mode movements of the masses. Stated another way, normal test signals 620 and 623 may be used to detect inertial displacements of the masses A and B, whereas self-test signals 620 and 626 may be used to detect non-inertial displacements of the masses A and B.

In yet other embodiments (not shown), amplitudes of the output signals may be compared to ascertain at least the directions of the movements of the masses A and B.

Figure 7:
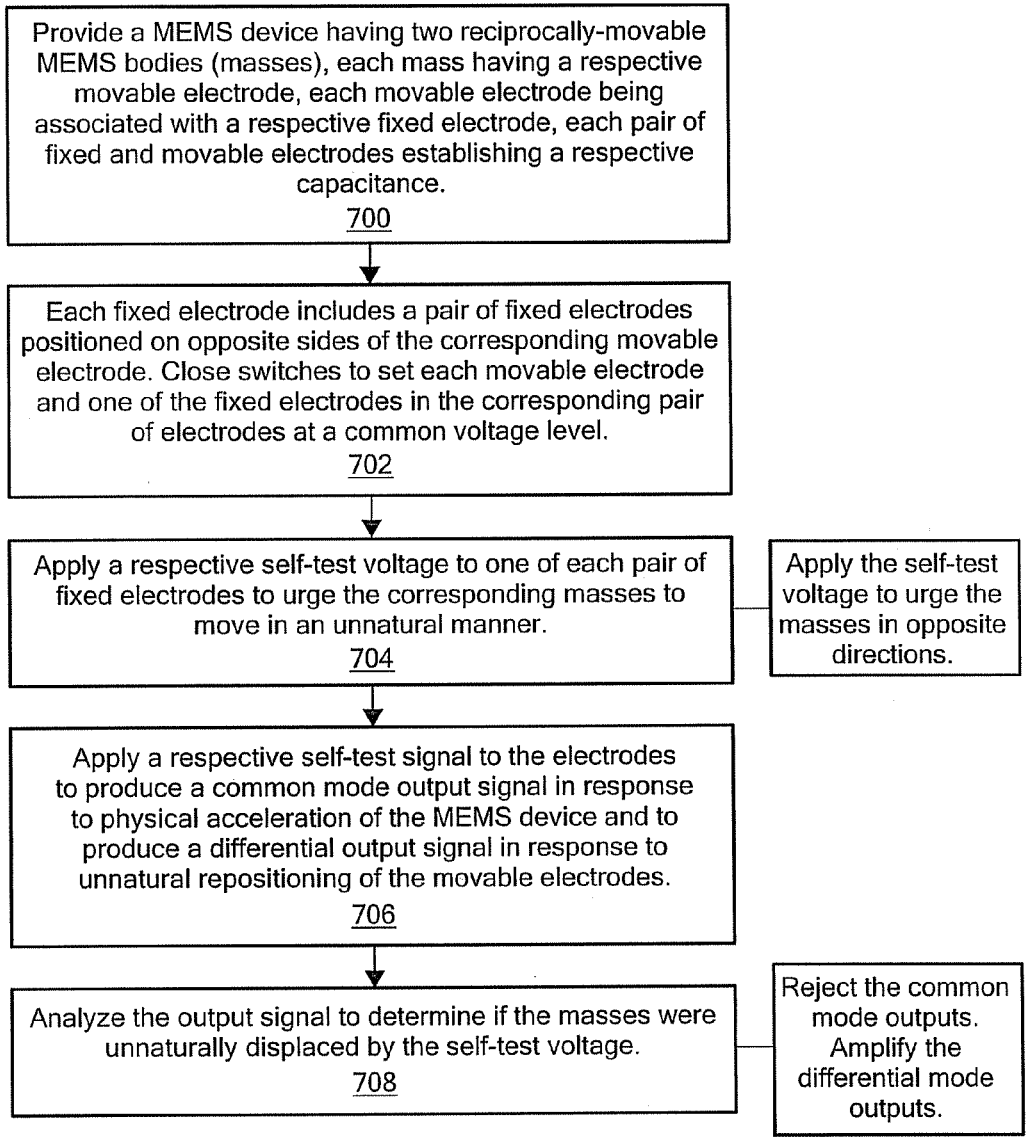
FIG. 7 is a flowchart illustrating a method for self testing a MEMS device, according to an embodiment of the present invention.

FIG. 7 depicts a flowchart that illustrates a method for self testing a MEMS device. At 700, a MEMS device is provided. The MEMS device has two reciprocally-movable MEMS bodies (masses). Each mass has a movable electrode. Each movable electrode is associated with a fixed electrode. Each associated pair of fixed and movable electrodes establishes a capacitance.

Each fixed electrode includes a pair of fixed electrodes, with the associated fixed electrode between the pair of fixed electrodes. At 702, switches are closed to set each movable electrode to a substantially common voltage level with one if its associated fixed electrodes. At 704, a self-test voltage is applied to one of each pair of fixed electrodes to urge the corresponding mass to move in an unnatural manner. For example, the voltages may be applied to urge the masses to move in opposite directions.

At 706, the switches may be opened, and self-test signals may be applied to the fixed electrodes to produce a common mode output from the movable electrodes in response to physical acceleration of the MEMS device, and to produce a differential output from the movable electrodes in response to unnatural repositioning of the movable electrodes, such as the unnatural repositioning caused in operation 704. At 708, the output is analyzed to determine if the masses were unnaturally displaced by the self-test voltages, i.e., if the MEMS device is good.

By providing a self-test regimen that produces a differential mode output as a result of unnatural displacement of the masses, it is possible to test the MEMS device while the MEMS device is in motion or it is being accelerated. Disturbances of the MEMS device, such as due to ambient noise, apply relatively equally to the two MEMS bodies, and such common movement of the bodies is ignored by the self test. Thus, a control module in communication with a dual-mass MEMS linear accelerometer could be programmed to perform a self test, according to the present invention, on the accelerometer, even when the accelerometer is in a moving or accelerating vehicle.

The output signals from the movable electrodes in the self test are further processed with conventional electronics for detecting differential signals. As noted, the outputs from the movable electrodes may be passed through a differential amplifier. The MEMS device could alternatively be designed to pass the outputs of the movable electrodes to an integrator. Other well known filters and amplifiers may be used to provide a differential mode output signal that detects movement of the MEMS bodies in different directions.

Testing and self-testing of MEMS devices have been described as involving the application of self-test voltages and self-test signals to electrodes of the MEMS devices. These self-test voltages and self-test signals may be generated external to the MEMS device, such as by a test voltage and/or test signal generator. Optionally or alternatively, these test voltages and/or self-test signals may be generated within the MEMS device under test. In some embodiments, MEMS devices include two or more movable masses, fixed and movable electrodes and self-test voltage and/or self-test signal generators, all within a single package. In some such embodiments, the self-test voltage and/or self-test signal generators are fabricated on the same die as the movable masses. In other embodiments, the self-test voltage and/or self-test signal generators may be fabricated on a separate die, and this die and a die including the movable masses may be electrically connected together and co-packaged.

Testing and self-testing of MEMS devices has been described as being performed as part of a manufacturing process or in situ, such as part of a power-on self-test procedure. However, in some contexts, MEMS devices may be self-tested, as described herein, during normal operation. For example, when a vehicle transmission is shifted into a "park" mode, MEMS accelerometers that normally detect crashes and trigger the deployment of airbags may be temporarily taken off-line for a brief period of time and self-tested. The amount of time the device may be temporarily taken off line depends on the application or circuit (collectively "application"). For example, crash sensors in vehicles may be taken off line for relatively short periods of time, such as times measured in milliseconds, while the vehicles travel about, whereas gyro sensors in spacecraft may be temporarily taken off line for relatively long periods of time, possibly measured in seconds, minutes or hours.

The length of time a sensor may be taken off line may depend on several factors, such as the expected rate of change in acceleration of the device, the amount of redundancy in the system (i.e., whether other sensors may be used while a given sensor in involved in a self-test procedure) and the amount of risk of loss of data that may be tolerated by a system. The length of time a sensor may be taken off line for self testing should be predetermined, based on such factors. In contrast, removing a device that is being used in an application, then performing a self-test of the removed device, and then returning the device to the application is not considered temporarily taking a device off line, i.e., doing so is not considered a temporary cessation of applying the test signals.

Embodiments of the invention may be practiced with MEMS sensors that are not linear accelerometers. Some sensors, gyroscopes or accelerometers may respond in a see-saw fashion about a pivot point, or change in terms of rotation vector, in response to an acceleration. A self-test voltage may be applied to urge the MEMS bodies to respond in an unnatural manner. The self-test signals are then applied so that movement of the MEMS bodies in a manner naturally associated with physical acceleration produce common mode output. The self-test signals are such that differential output detects the unnatural movement of the MEMS bodies imposed by the self-test voltage.

The embodiments of the invention described above are intended to be merely exemplary; numerous variations and modifications will be apparent to those skilled in the art. For example, a MEMS device having more than two MEMS bodies may be tested using embodiments of the present invention. All such variations and modifications are intended to be within the scope of the present invention as defined in any appended claims.

What is claimed is:

1. A method for self testing a MEMS device comprising:
providing the MEMS device having a first reciprocally movable MEMS body carrying a first movable electrode establishing a capacitance with a first fixed electrode and a second reciprocally movable MEMS body carrying a second movable electrode establishing a capacitance with a second fixed electrode, each MEMS body movable in response to an applied acceleration;
applying a self-test voltage such that one of the MEMS bodies is urged to move against the movement it would naturally follow in response to an applied physical acceleration and the other MEMS body is urged to move in sympathy with the movement it would naturally follow in response to the same applied physical acceleration; and
applying self-test signals to at least one of the first and second fixed electrodes and the first and second movable electrodes so as to produce a common mode output signal from at least one of the first and second movable electrodes and the first and second fixed electrodes in response to physical acceleration of the MEMS device and to produce a differential output signal from the at least one of the first and second movable electrodes and the first and second fixed electrodes in response to unnatural repositioning of the first and second movable electrodes.

2. A method for self-testing a MEMS device according to claim 1, further comprising receiving the output signals from the at least one first and second movable electrodes and the first and second fixed electrodes and further processing the differential output signals and rejecting the common mode output signals.

3. The method of self testing of claim 2, wherein the further processing comprises amplifying.

4. The method of self testing of claim 2, wherein the further processing comprises integrating.

5. The method of self testing of claim 2, wherein the further processing comprises filtering.

6. The method of self testing of claim 1, wherein each of the first and second fixed electrodes comprises a pair of electrodes positioned on opposite sides of its corresponding movable electrode and wherein applying a self-test voltage includes setting each movable electrode and one of the fixed electrodes in the corresponding pair of electrodes at a substantially common voltage level.

7. The method of self testing of claim 6, wherein the one of the fixed electrodes corresponding to the first movable electrode is located in one direction along the single axis, relative to the first movable electrode, and the one of the fixed electrodes corresponding to the second movable electrode is located in a direction opposite the one direction, relative to the second movable electrode.

8. The method of self testing of claim 6, wherein the act of setting comprises switching the first movable electrode into electrical connection with the one of the fixed electrodes in the pair of electrodes corresponding to the first movable electrode and switching the second movable electrode into electrical connection with the one of the fixed electrodes in the pair of electrodes corresponding to the second movable electrode.

9. The method of self testing of claim 8, further comprising, before the act of applying self-test signals to the at least one of the first and second fixed electrodes and the first and second movable electrodes, disconnecting the first movable electrode from its corresponding one of the fixed electrodes and disconnecting the second movable electrode from its corresponding one of the fixed electrodes.

10. The method of self testing of claim 1, further comprising:
applying a normal test signal to at least one of the first and second fixed electrodes and the first and second movable electrodes so as to produce a differential output signal from at least one of the first and second movable electrodes and the first and second fixed electrodes in response to physical acceleration of the MEMS device and to produce a common mode output signal from the at least one of the first and second movable electrodes and the first and second fixed electrodes in response to unnatural movement of the first and second movable electrodes;

temporarily ceasing to apply the normal test signal;

during at least part of the temporary cessation, applying the self-test voltage, then applying the self-test signals and then ceasing to apply the self-test signals, wherein the temporary cessation lasts less than a predetermined amount of time related to an application of the MEMS device; and after ceasing to apply the self-test signals, again applying the normal test signal.

11. A method for self testing a MEMS device comprising:

providing the MEMS device having a first reciprocally movable MEMS body carrying a first movable electrode establishing a capacitance with a first fixed electrode and a second reciprocally movable MEMS body carrying a second movable electrode establishing a capacitance with a second fixed electrode, both MEMS bodies movable along a single axis;

applying a self-test voltage such that the first MEMS body and the second MEMS body are urged to move in opposite directions; and applying self-test signals to at least one of the electrodes so as to produce a common mode output signal from at least one of the electrodes in response to movement of the first and second movable electrodes in the same direction and to produce a differential output signal from the at least one electrodes in response to opposing repositioning of the first and second movable electrodes.

12. The method of self testing of claim 11 further comprising receiving the output signals from the at least one electrodes and further processing the differential output signals and rejecting the common mode output signals.

13. The method of self testing of claim 12, wherein the further processing comprises amplifying.

14. The method of self testing of claim 12, wherein the further processing comprises integrating.

15. The method of self testing of claim 12, wherein the further processing comprises filtering.

16. The method of self testing of claim 11, wherein each of the first and second fixed electrodes comprises a pair of electrodes positioned on opposite sides of its corresponding movable electrode and wherein applying a self-test voltage includes setting each movable electrode and one of the fixed electrodes in the corresponding pair of electrodes at a substantially common voltage level.

17. The method of self testing of claim 16, wherein the one of the fixed electrodes corresponding to the first movable electrode is located in one direction along the single axis, relative to the first movable electrode, and the one of the fixed electrodes corresponding to the second movable electrode is located in a direction opposite the one direction, relative to the second movable electrode.

18. The method of self testing of claim 16, wherein the act of setting comprises switching the first movable electrode into electrical connection with the one of the fixed electrodes in the pair of electrodes corresponding to the first movable electrode and switching the second movable electrode into electrical connection with the one of the fixed electrodes in the pair of electrodes corresponding to the second movable electrode.

19. The method of self testing of claim 18, further comprising, before the act of applying self-test signals to the at least one electrodes, disconnecting the first movable electrode from its corresponding one of the fixed electrodes and disconnecting the second movable electrode from its corresponding one of the fixed electrodes.

20. A self-testable MEMS device comprising:

first and second MEMS masses configured for physical displacement within the MEMS device in response to acceleration of the MEMS device, each first MEMS mass having at least one first associated movable electrode configured for movement therewith and at least one first associated fixed electrode, and each second MEMS mass having at least one second associated movable electrode configured for movement therewith and at least one second associated fixed electrode, wherein pairs of the fixed and movable electrodes establish capacitances, each capacitance varying in relation to spacing between the respective fixed and movable electrodes; and a signal generator configured to:

apply at least one self-test voltage to at least one of the electrodes, such that one of the MEMS masses is urged to move against the movement it would naturally follow in response to an applied physical acceleration and the other MEMS mass is urged to move in sympathy with the movement it would naturally follow in response to the same applied physical acceleration; and after applying the at least one self-test voltage, apply self-test signals to at least one of the electrodes so as to produce a common mode output signal from at least one of the electrodes in response to physical acceleration of the MEMS device and to produce a differential output signal from the at least one of the electrodes in response to unnatural repositioning of the first and second movable electrodes.

21. The self-testable MEMS device according to claim 20, further comprising:

a first switch coupled between the at least one first movable electrode and the at least one first fixed electrode;

a second switch coupled between the at least one second movable electrode and the at least one second fixed electrode; and a control circuit within the MEMS device and configured to close the first and second switches for at least part of the time the at least one self-test voltage is applied and to open the first and second switches for at least part of the time the self-test signals are applied.

22. The self-testable MEMS device according to claim 21, further comprising a differential amplifier coupled to receive the differential output signal from the at least one of the electrodes.

23. The self-testable MEMS device according to claim 22, wherein:

each at least one fixed electrode comprises a pair of electrodes positioned on opposite sides, respectively, of its associated movable electrode;

the first switch is coupled between the at least one first movable electrode and one of each pair of electrodes of the at least one first fixed electrode, the one of each pair of electrodes lying in one direction from the first movable electrode;

the second switch is coupled between the at least one second movable electrode and one of each pair of electrodes of the at least one second fixed electrode, the one of each pair of electrodes lying in a direction opposite the one direction from the second movable electrode.

* * * * *